INVENTOR
J. R. PIERCE
BY H. A. Burgess
ATTORNEY

INVENTOR
J. R. PIERCE
BY H. A. Burgess
ATTORNEY

INVENTOR
J. R. PIERCE
BY
H. A. Burgess
ATTORNEY

INVENTOR
J. R. PIERCE
BY H. A. Burgess
ATTORNEY

April 3, 1956 J. R. PIERCE 2,740,838

PULSE TRANSMISSION SYSTEM

Filed Aug. 17, 1951 6 Sheets-Sheet 5

INVENTOR
J. R. PIERCE
BY H. A. Burgess
ATTORNEY

April 3, 1956 J. R. PIERCE 2,740,838

PULSE TRANSMISSION SYSTEM

Filed Aug. 17, 1951 6 Sheets-Sheet 6

INVENTOR
J. R. PIERCE
BY H. A. Burgess
ATTORNEY

United States Patent Office 2,740,838
Patented Apr. 3, 1956

2,740,838

PULSE TRANSMISSION SYSTEM

John R. Pierce, Berkeley Heights, N. J., assignor to Bell Telephone Laboratories, Incorporated, New York, N. Y., a corporation of New York Application August 17, 1951, Serial No. 242,314
13 Claims. (Cl. 179—15)

This invention relates to pulse communication systems employing time division multiplex. In its various aspects it deals with combining several signal waves in time division multiplex, dropping preselected channels at a radio repeater, inserting new channels in place of those dropped and sorting out the multiplexed waves at a receiver.

Pulse communication systems utilizing time division multiplex are now well known. The pulses may individually represent, by their amplitude, duration, phase, etc., instantaneous signal sample amplitudes, or together with other pulses may comprise a code group (sometimes known as a character) which represents the instantaneous sample. Systems of the latter type are known as pulse code modulation systems and are described for example in an article by E. Peterson and L. A. Meacham entitled "An Experimental Multichannel Pulse Code Modulation System of Toll Quality" appearing in the Bell System Technical Journal for January 1948 at page 1.

The sampling rate of any one channel should be at least twice the highest frequency contained in the signal wave in that channel in order to accurately reproduce the signal at a receiver. The number of channels which may be multiplexed in time division will therefore depend on the duration of the pulses and on the frequency characteristics of the wave forms to be transmitted. To simplify the present discussion all channels will be presumed to be speech channels with a band restricted to a range below 3500 cycles per second; a sampling rate of 8000 per second is typical for the pulse transmission of such wave forms and will be employed in the present illustration.

The number of channels which may be combined in time division is therefore a function of the pulse duration which necessarily involves bandwidth since shorter and more closely spaced pulses require a broader band. Advancements in microwave transmission techniques at constantly higher frequencies have tended to reduce the bandwith limitations so that the principal remaining limitation is one of means for generating and handling extremely short pulses. It is such means as the latter to which the broad aspects of the present invention are directed.

It is an object of the invention to increase the number of channels which can be handled by a time division multiplex system.

Another object of the invention is to reduce the limitations on pulse duration in pulse communication systems employing time division multiplex.

Another object of the invention is to simplify the multiplexing and channel dropping circuits and apparatus in a time division multiplex system employing extremely short pulses. More specifically, it is an object to reduce the amount of high frequency broad-band apparatus and circuits required to control such a system and to employ, instead, low frequency, narrow-band circuit elements.

A more specific object of the invention is to controllably drop preselected channels at a station intermediate the terminals of a pulse transmission system and more particularly a system employing very short pulses, for example, pulses on the order of one to ten millimicroseconds (.001–.01 microsecond) in duration.

Another object of the invention is to drop preselected channel pulses in a time division multiplex pulse transmission system and to insert in place of the dropped pulses, where desired, new channel pulses. A related object is to drop and insert very short signal pulses by means which are controlled by relatively long pulses.

It is also an object of the invention to controllably drop particular time division pulse code modulation signals in a system handling a thousand or more channels.

Another object of the invention is to combine a plurality of multiplexed pulse code trains in a single resultant pulse train and to drop preselected trains at a radio repeater.

As an illustration of the present invention there is described in detail below a pulse code modulation system capable of handling 2000 speech channels in time division multiplex. The illustrative system employs a seven digit binary code so that seven pulses are transmitted for each instantaneous sample in each channel. (The term "pulse" is used herein to include spaces which in a given system may be either pulses of a different or zero amplitude.) Therefore, seven times 2000 or 14,000 pulses are sent in each sampling interval of $\frac{1}{8000}$ second (125 microseconds). This gives a pulse repetition rate of 112 megacycles per second and a frame frequency of 8000 cycles per second. Since it is necessary in a pulse code modulation system to determined for each pulse position merely whether a pulse is present or not, it is not necessary to separate the adjacent pulses in time. Therefore the pulse duration may be equal to $$\frac{125 \text{ microseconds}}{14{,}000} = .009 \text{ microsecond}$$

with the separation of adjacent pulses, center to center, also equal to .009 microsecond.

The seven digit pulses of each code group are inserted every tenth pulse position so that 70 pulse periods are necessary to represent any one message sample. A character or code group from each channel is sent once each frame with the characters from the various channels occupying corresponding portions, spanning seventy pulse positions, of each frame. Therefore, at a channel dropping repeater, access may be given to 200 channels by dropping switches which operate at one-tenth the pulse repetition rate or every .09 microsecond (112 megacycles per second). Further, the line switches need operate only every 70 pulse positions or every .63 microsecond (1.6 megacycles per second). Therefore, the pulses which operate the channel dropping switches are the only ones which need be as short as the signal pulses and which must be very accurately timed. The remaining control pulses such as those which operate the line switches can be relatively long and need not be as accurately timed. The control pulses are generated locally at each repeater under the control of synchronizing pulses which are transmitted with the signal pulses.

If the dropping switches operate completely throughout each frame, a pulse train representing 200 channels in time division will be dropped. They may, however, be operated only during the seventy pulse position intervals of each frame that a preselected fraction of 200 channels occur.

The illustrative system is intended to operate at a frequency on the order of 20,000 megacycles. At this frequency, a pulse bandwidth, on the order of several hundred megacycles will not be intolerable.

In accordance with the illustrative embodiment of a channel dropping repeater described in more detail below a first microwave switch connected in series with the main transmission path is opened at the instant a channel pulse is to be dropped. At the same instant a second microwave switch connected in a first branch path which branches from the main transmission path at a point ahead of the first switch and a third switch connected to a second branch path which branches from the main path at a point following the first switch are closed. The pulses which are dropped while the second switch is closed pass through the first branch path to decoding means which route the recovered signal segments to the proper lines. Channels to be added are routed in turn from their respective lines through coding means and the second branch path to assume the time positions left vacant by the dropped pulses.

The microwave switches themselves comprise waveguide hybrid junctions having one pair of conjugately related arms terminated by non-linear impedance elements. The dropping pulses vary the bias on these nonlinear elements to change their impedance from a value which matches the characteristic impedance of their associated arms to one which greatly mismatches the guide so that energy entering the hybrid is either completely absorbed or is transmitted through the junction without appreciable loss under control of the dropping pulses.

The invention, its objects and features may be better understood from a consideration of the following detailed description when read in accordance with the attached drawings, in which.

Figure 1:
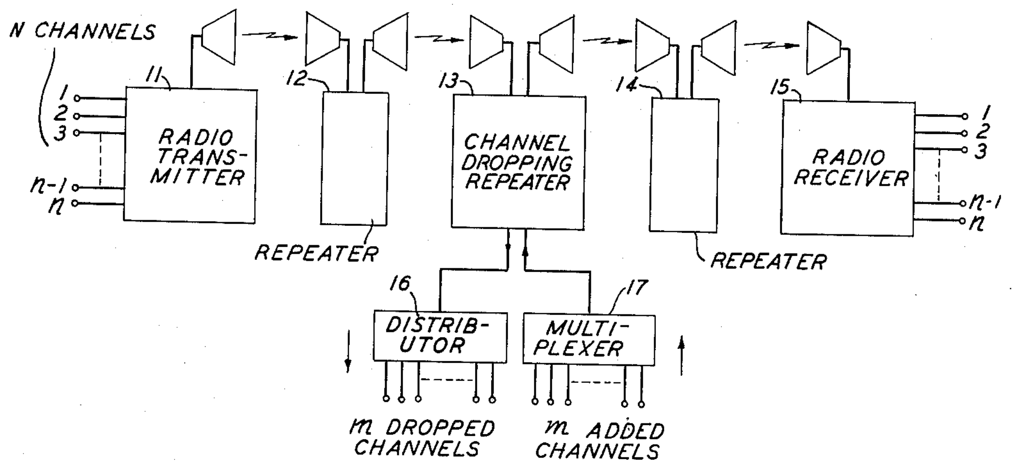
Fig. 1 illustrates by block diagram a radio relay system including a channel dropping repeater.

Some of the major components of a radio relay system are illustrated in block diagram form in Fig. 1. A plurality of lines, $n$ in number, apply signals to a radio transmitter 11. The transmitter translates the signals into groups of pulses in accordance with a given code and combines the pulses from the various channels in time division for transmission as a single pulse train. The transmitted signal is relayed by means of repeaters 12, 13, and 14 to a distant terminal comprising the receiver 15 where the original signals are recovered and distributed to the proper lines.

The repeater 13 is of the channel dropping variety. The repeaters 12 and 14 merely receive, regenerate, and retransmit the signal wave. For example, the channel dropping repeater 13 may be located in an intermediate city while the repeaters 12 and 14 are spaced in a line-of-sight manner between this city and the terminal stations 11 and 15. The repeaters 12 and 14 may, for example be incompletely regenerative repeaters of the type described in my copending application Serial No. 184,046 filed September 9, 1950. Such repeaters would be located several miles apart. Completely regenerative repeaters of the type described in the copending application of R. E. Carbrey, C. C. Cutler and C. B. Feldman Serial No. 176,238 filed July 27, 1950, may also be employed. Such repeaters could be spaced 30–50 miles apart, for example, on hill tops.

The channel dropping repeater 13 has access to $m$ of the $n$ channels being relayed. The pulses from these channels are dropped, decoded and applied to any of the $m$ lines connected thereto by means of a distributor 16. If $m$ channels are dropped at the repeater, $m$ outgoing channels become available. Therefore, signals from any or all of $m$ incoming lines may be coded and inserted in the time positions left vacant by the dropped channels by the multiplexer 17. Other channel dropping repeaters may be included between the terminals to give access to the same or other groups of channels at other intermediate points. The use of channel dropping repeaters in radio relay systems makes possible communication not only between the terminal stations themselves but also between the terminal stations and intermediate locations and also between the intermediate locations. In addition to the channel dropping equipment the repeater 13 may also have equipment to either completely or incompletely regenerate the relayed signals which latter equipment may be similar to that in the repeaters 12 and 14 mentioned above.

Figure 4:
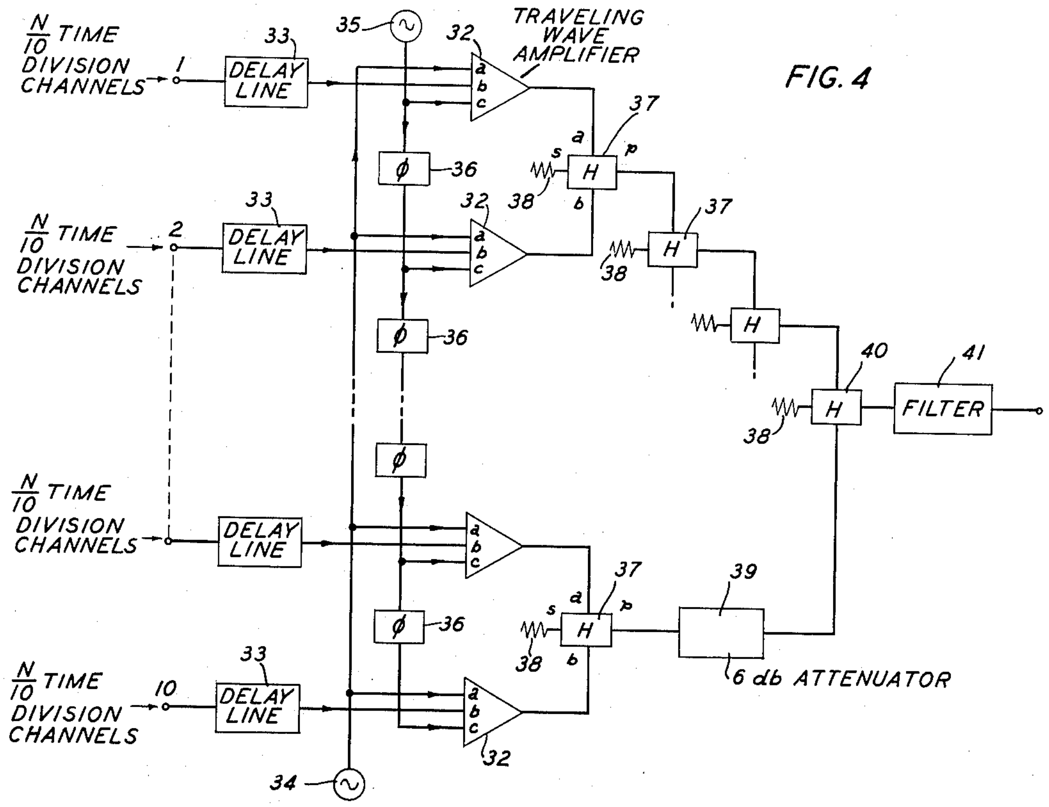
Fig. 4 illustrates by block schematic diagram the multiplexing equipment at the transmitting terminal of a system in accordance with the present invention.
Figure 2:
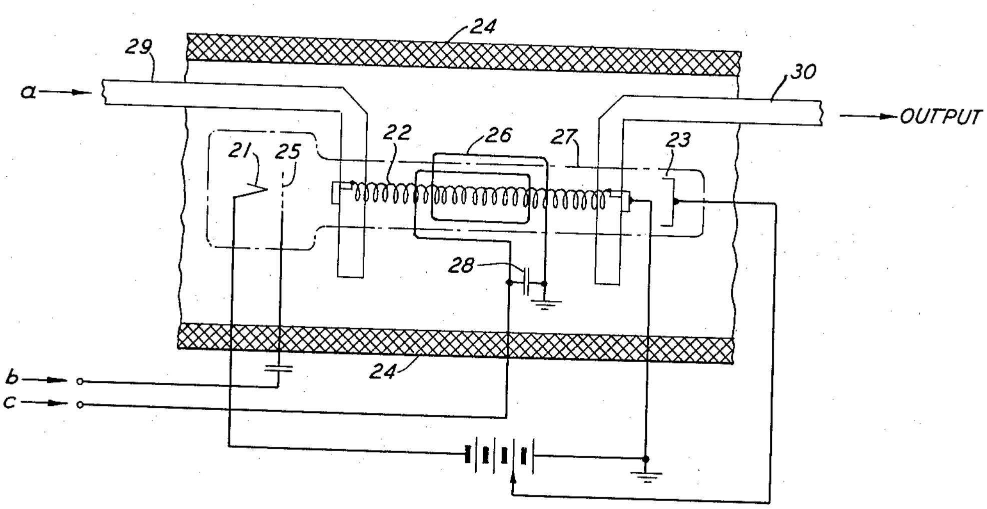
Fig. 2 is a schematic diagram of a traveling-wave tube employed in the illustrative embodiments as a gating amplifier.
Figure 3:
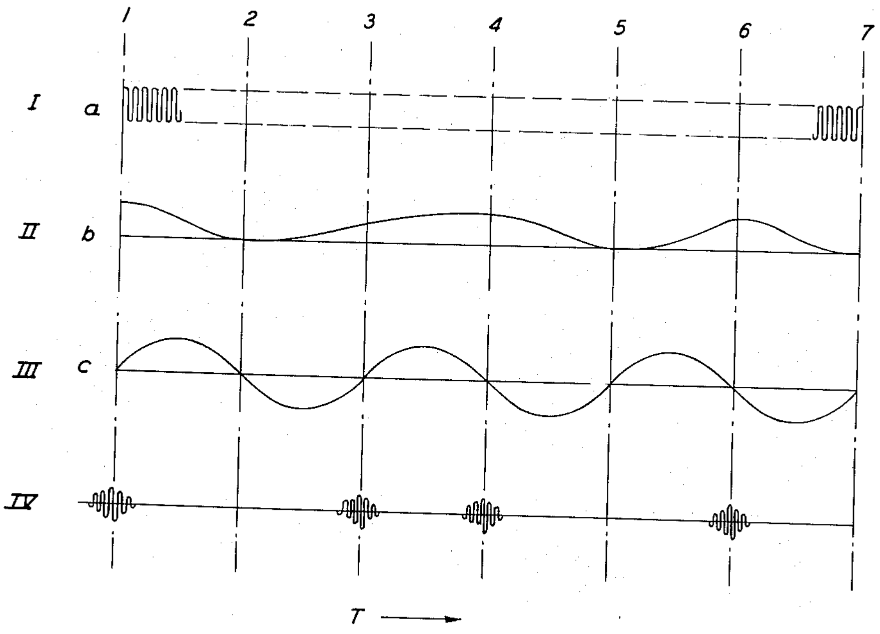
Fig. 3 shows wave forms illustrative of the operation of the gating amplifier of Fig. 2.

A terminal whereby the relatively long pulses of relatively low repetition frequency which comprise the pulse code modulation signals of the input lines may be combined in time division so as to give a radio frequency signal consisting of very short pulses of a microwave pulse frequency is illustrated by Figs. 2, 3, and 4. Use is made of what may be called "gating amplifiers." By way of example, a traveling-wave tube can be used as a gating amplifier as shown in Fig. 2. Traveling-wave amplifiers are described in a book of mine entitled "Traveling Wave Amplifiers," Van Nostrand 1950. In addition to the conventional elements of a traveling-wave amplifier which comprise the cathode 21, helix 22, collector 23 and focussing coil 24 shown in Fig. 2 there is also provided a modulating electrode or grid 25 interposed between the cathode and the input of the helix. A traveling-wave amplifier having such a grid electrode is described in a copending application of J. A. Morton Serial No. 208,204 filed January 27, 1951. There is also provided a magnetic deflecting coil 26 which surrounds the glass envelope 27 of the tube. The coil 27 is resonated by a capacitor 28 and is excited by a sinusoidal input at input $c$. If a radio frequency input is applied to the input wave guide 29 at $a$ there will be an output in the output wave guide 30 of this radio frequency only when the electron beam emitted by the cathode 21 goes through the entire helix. When the beam is deflected, there will not only be attenuation of the radio frequency energy due to the helical line but there will also be a lack of the gain which is provided by interaction between the beam and traveling wave when the beam traverses the helix. A beam of electrons will traverse the complete helix only when (1) the modulator electrode 25 is driven sufficiently positive by an input at $b$ to permit the beam to form, and (2) the magnetic field produced by the deflecting coil 26 is approximately zero.

Consider, for example, the case in which the signals shown in Fig. 3 are applied to the amplifier shown in Fig. 2. A steady radio frequency signal, I is applied to the input wave guide at $a$. To the modulator input, $b$, a relatively slowly varying pulse code modulation signal II is applied. (The signal shown comprises the code group 1011010, the nominal pulse occurrence times being indicated at 1, 2, . . . 7 as shown.) The input to the deflection coils, $c$, produces a sinusoidal magnetic field whose intensity varies at a frequency equal to one-half the frame frequency as shown at III. It will be noted that the magnetic field is zero at the nominal pulse occurrence times. The output, IV will, therefore, comprise the very short microwave pulses which reproduce the pulse code modulation signal II. Pulses as short as 2 millimicroseconds have been produced experimentally in the manner just described.

Each of the ten lines 1, 2, . . . 10 in Fig. 4 applies relatively long pulse code modulation pulses to the input *b* of a gating amplifier 32 of the type just described. The signals on each of these lines appear as shown in wave form II of Fig. 3. Further, the signals on each of these lines is a pulse train comprising non-interlaced code groups from two hundred communication channels. For example, the first seven pulses (and/or spaces) on line 1 will comprise the code group from a first channel, the next seven pulses (and/or spaces) will comprise the code group from a second channel etc.; similarly, for each of the other lines. In other words the signal on the ten lines are pulse code modulation signals multiplexed by code groups.

The code characters from each of the ten lines are interlaced in the resultant time division pulse train. This is accomplished by inserting a pulse from each line every tenth pulse position in the resultant signal. If the total number of channels is $n$ (=2000 in the illustration) the relative phase positions of the pulses in the successive lines in $$\frac{2\pi}{n}$$

radians. This is achieved for example by inserting sections of delay line 33 of proper dimensions in the various lines. The source 34 supplies microwave energy of the desired pulse frequency, i. e., center frequency, to the terminal *a* of each of the ten gating amplifiers 32. A sinusoidal waves of one-half the input pulse repetition frequency (5.6 megacycles per second in the illustration) is applied to each of the amplifiers at terminal *c* from the source 35. The sinusoidal inputs of successive amplifiers differ in phase by $\pi/n$ cycles of the input repetition frequency so that the time a beam can go through a given tube coincides with the pulse positions of the pulse code modulation channel applied to the input *b* of that tube. This phase difference is achieved by the use of the phase shifters 36.

The outputs of the gating amplifiers 32 comprises non-overlapping trains of pulse code modulation pulses corresponding to the $n$ inputs. The various outputs are combined in pairs by use of the wave-guide hybrid junctions 37. Wave-guide hybrid junctions are described in W. A. Tyrrell Patent 2,445,896 dated July 27, 1948 and are illustrated pictorially in Fig. 7. The *p* and *s* arms, and *a* and *b* arms of the hybrid junctions are, respectively, in a conjugate relation to each other so that there is no direct coupling between them. In Fig. 4, energy entering the *a* and *b* arms of each hybrid divides between the *p* and *s* arms. Energy in the *s* arm of each hybrid is dissipated in the impedance 38 which matches the characteristic impedance of the *s* arm. The outputs of these junctions are combined by pairs until all outputs form the output of a channel hybrid junction 40. The 6-decibel attenuator 39 compensates for the extra six decibels of attenuation that the outputs of the other amplifiers will undergo in passing through two more hybrid junctions. If the number of outputs to be combined were a power of two, this attenuator would be unnecessary since all outputs would then pass through the same number of hybrid junctions. The output of this junction is passed through a filter 41 to produce the desired radio frequency pulse shape and forms the desired radio frequency time division pulse code modulation output. Any variations in power among the tubes forming the output can be corrected if necessary by passing the signal through one or more regenerative repeaters.

Figure 5:
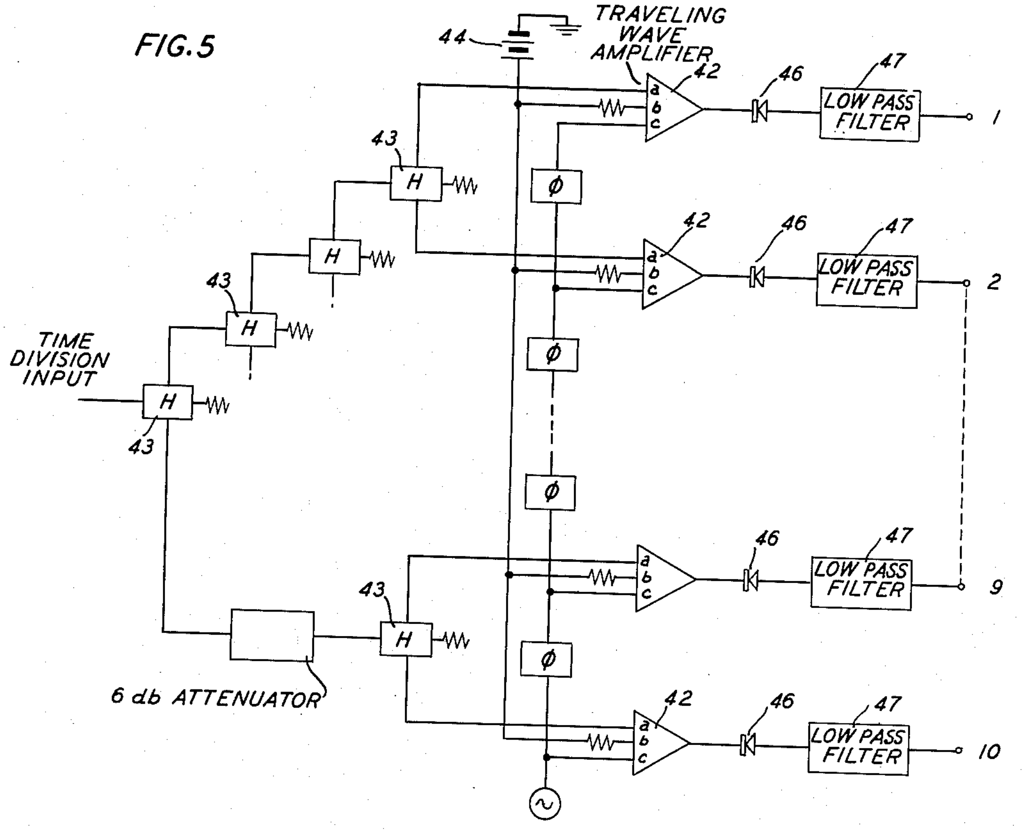
Fig. 5 illustrates in a similar manner the equipment at a receiving terminal designed to sort out the multiplexed channels.

In sorting out the channels at the receiving end the components used can be the same as those used in the transmitting terminal connected as shown in Fig. 5. Referring to Fig. 5, the time division radio frequency input is applied to the inputs *a* of ten gating amplifiers 42 by means of the hybrid junctions 43. The modulating electrodes are biased at input *b* by the battery 44 so as to give a beam at all times. A properly phase shifted sinusoidal signal of half the line (i. e., lines 1 through 10) pulse frequency is applied to the deflection inputs *c* from the source 45. Thus a gating amplifier 42 will pass only those short pulses emitted by the corresponding gating amplifier at the transmitting terminal, Fig. 4, i. e., the pulse train belonging to that line.

Each of the ten low repetition frequency pulse trains will be represented at the output of one of the gating amplifiers 42 by a series of very short microwave pulses. These pulses can be rectified by diodes 46 and lengthened and shaped by low pass filters 47 to produce the ten original time division signals comprised of relatively long pulses at the outputs 1, 2, . . . 10.

Figure 6A:
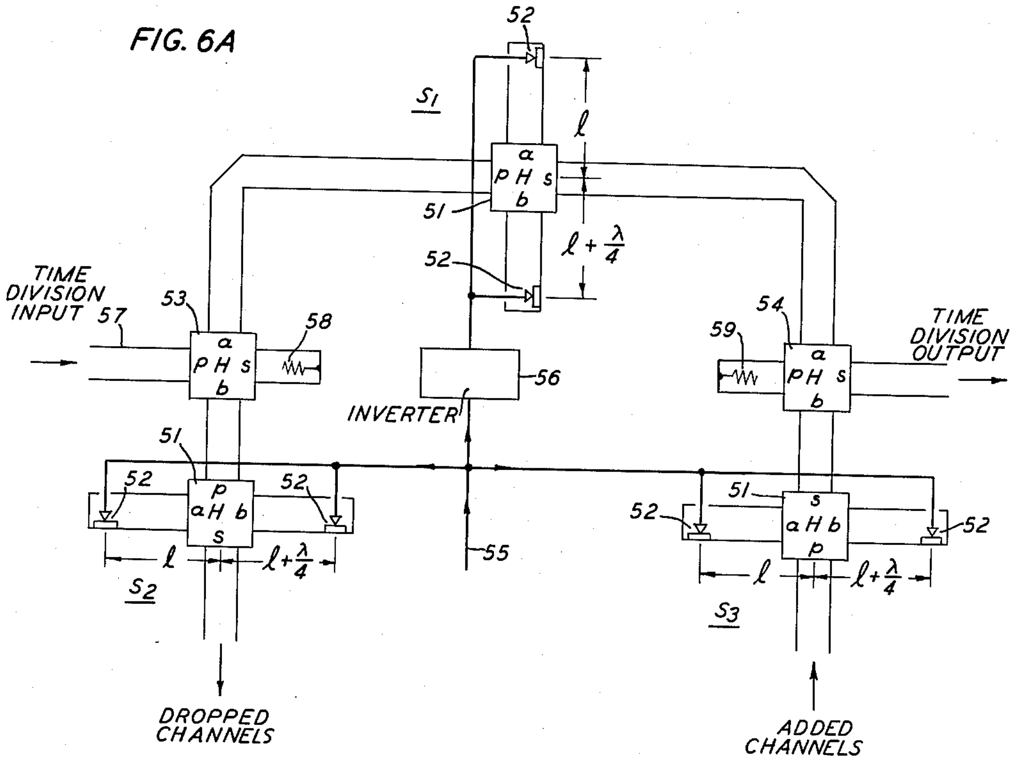
Fig. 6A is a broad-band microwave dropping switch in accordance with the present invention.

One of the basic components of a channel dropping repeater in accordance with the present invention is the switching arrangement shown in Fig. 6A. The same arrangement is shown in idealized form in Fig. 6B. $S_1$, $S_2$ and $S_3$ are switches. $S_1$ is connected in series with the main transmission path while $S_2$ is connected in a branch path which branches from the main transmission path ahead of $S_1$, and $S_3$ is in a branch path which branches from the main path at a point following $S_1$. $S_2$ and $S_3$ will be closed and $S_1$ open at the time the pulses of the channel to be dropped appear. At all other times $S_1$ will be closed and $S_2$ and $S_3$ will be open.

Figure 7:
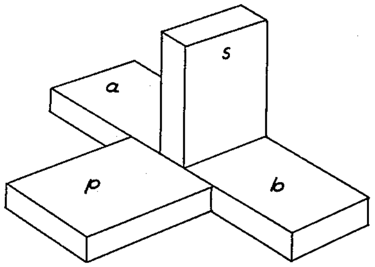
Fig. 7 illustrates pictorially a wave-guide hybrid junction.

In accordance with the present invention the switches $S_1$, $S_2$ and $S_3$ each comprise a wave-guide hybrid junction 51 of the type illustrated in Fig. 7 which has its *a* and *b* arms terminated by non-linear impedance elements 52 such as germanium crystal diodes as shown in Fig. 6A. The *p* and *s* arms are the input and output, respectively, of each switch. One of the *a* and *b* arms of each switch is a quarter of a wavelength longer than the other so that when the crystal diodes are biased and/or coupled to the wave-guide so as to greatly mismatch the impedance of the wave-guide arms in which connected, energy entering the *p* arms will be reflected from the *a* and *b* arms and add in phase in the *s* arms. In such a condition the switch is closed. If the crystal diode biases and hence the diode impedances are varied to such a value that the diodes match the impedance of the wave-guide arms in which connected, no energy will be reflected from the *a* and *b* arms and since there is no direct coupling between the *p* and *s* arms the switches will be open.

Figure 6B:
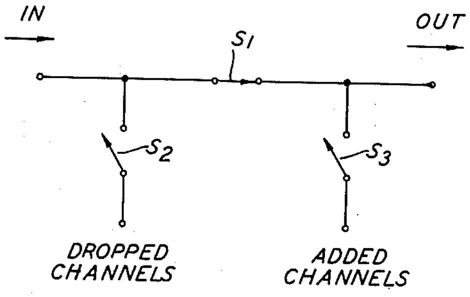
Fig. 6B illustrates the switch of 6A in generalized form.

These switches are combined as shown in Fig. 6A by means of the input and output hybrid junctions 53 and 54 to realize the idealized switch shown in Fig. 6B. The diodes 52 of the switches $S_2$ and $S_3$ are initially biased to the matching condition so that these switches will be normally open, "normally" referring to the non-dropping condition. The diodes of switch $S_1$ are initially biased in the mismatch condition so that switch $S_1$ is normally closed. At the time a channel pulse to be dropped is received, a pulse is applied to the lead 55 to alter the bias on all of the diodes 52 so that $S_2$ and $S_3$ will be closed and $S_1$ will be opened. If necessary, an inverter 56 may be connected ahead of the diodes 52 in switch $S_1$ or the diodes in $S_1$ may be coupled in such a manner that the same pulse can perform the closing functions on $S_2$ and $S_3$ and also the opening function on $S_1$ Input energy in the wave guide 57 will divide between the *b* and *a* arms of the hybrid junction 53. The *s* arm is terminated in its characteristic inpedance by the impedance 58 to absorb any energy which may be reflected into the *s* arm from either the *a* or *b* arms. If $S_1$ is closed and $S_2$ open this energy will appear only in the output of switch $S_1$. The energy in the output of $S_1$ will also divide in hybrid junction 54 between the *p* and *s* arms, the energy entering the *p* arm being dissipated by the impedance 59, due to the divisions of energy in the hybrid junctions 53 and 54. Energy passing through the switching arrangement undergoes six decibels of attenuation; this may be made up by a subsequent stage of amplification. When $S_2$ and $S_3$ are closed and $S_1$ open input energy applied to wave guide 57 will appear in the output of switch $S_2$; at the same time channel pulses may be added by way of the switch $S_3$ and the hybrid junction 54. The added pulses will assume the time positions left vacant by the dropped pulses, which are suppressed in the main transmission path by switch $S_1$.

The pulses which operate the dropping switches, i. e., the pulses which vary the biases of the crystal diode switches $S_1$, $S_2$ and $S_3$ will have to be very short and will also have to have considerable current at fairly low voltages. In the present illustrative example since the channel pulses are assumed to be .009 microsecond, the dropping pulses will have to be of substantially the same length or perhaps slightly longer, for example .0095 microsecond in length.

Figure 8:
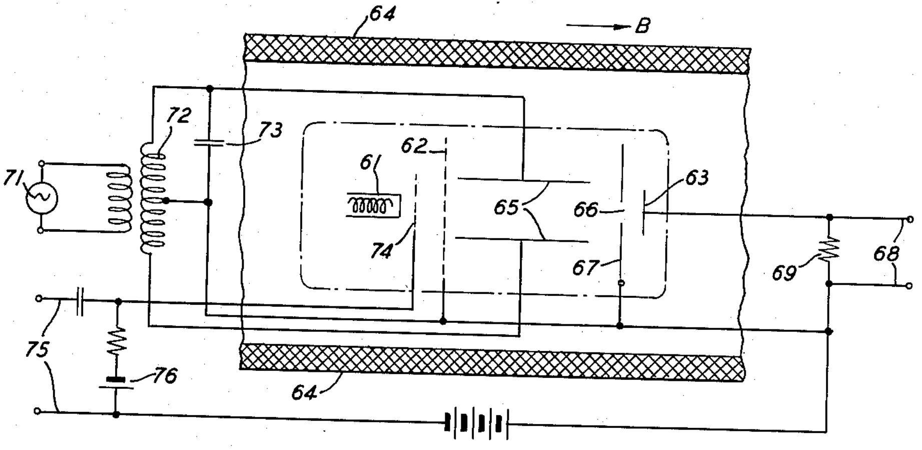
Fig. 8 is a pulse producing tube capable of producing the short pulses needed to operate the dropping switches.

A tube which will produce short video pulses of considerable current, e. g., 10–50 milliamperes at low voltages e. g., 150–300 volts is illustrated in Fig. 8. A tube of this type is disclosed in my copending application filed August 17, 1949, Serial No. 110,851. An electron beam is drawn from the indirectly heated cathode 61 by a positive grid 62 and an anode 63. The beam is focussed by an axial magnetic field B formed by the coil 64 which surrounds the tube. When no deflecting field is applied by the electrostatic plates 65 the beam passes through the aperture 66 in the masking electrode 67 which is located ahead of the anode 63, falls on the anode and appears as a pulse of current at the input of the line 68. The line is terminated at the input end and its characteristic impedance by a resistor 69. When a deflecting voltage is applied between the deflecting plates 65 the beam is deflected normal to the deflecting field and misses the aperture 66.

A sinusoidally varying wave is applied to the deflecting plates from a source 71 by means of the resonant circuit comprising the inductance 72 and capacitance 73. A very short pulse is thus produced at the input of the line 68 at a repetition rate of twice the sweep frequency. Whether or not a pulse will be produced is determined by the bias on the control grid 74 which is controlled by an input at the terminals 75. The time between the short output pulses can be used in changing the bias on the control grid. In this manner pulses as short as three or four millimicroseconds can be produced at a repetition rate of around ten megacycles which is what is desired in the present illustrative application. It may be noted that if the sinusoidal source is accurately synchronized with the channel pulses, the pulses which are applied to the terminals 75 need not be as accurately timed.

It should be noted that some distortion of the signal is allowable in dropping since, unless the distortion is too great the signal can be reformed by passing it through one or more regenerative repeaters.

Figure 9:
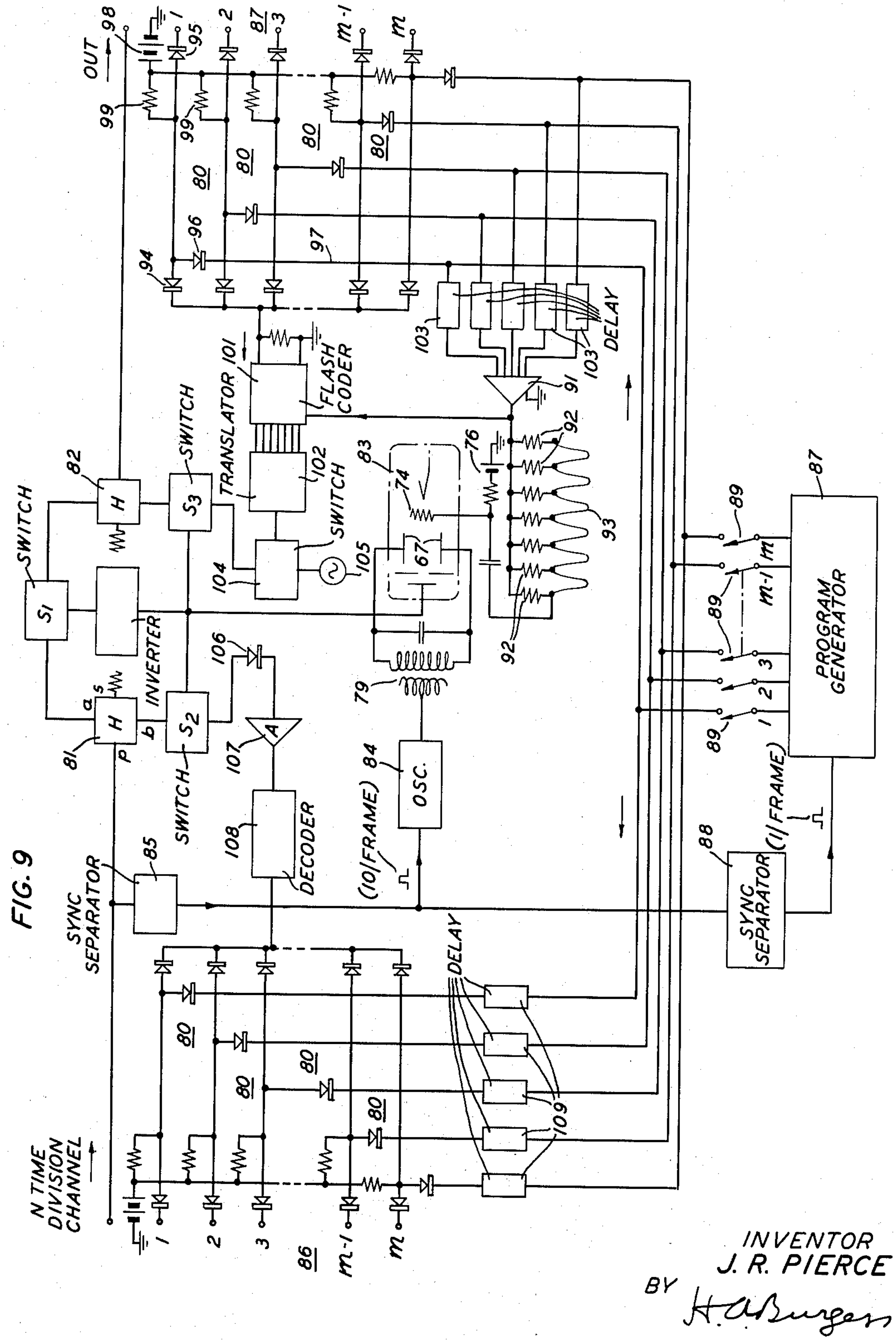
Fig. 9 is a channel dropping repeater employing principles of the present invention.
Figure 10:
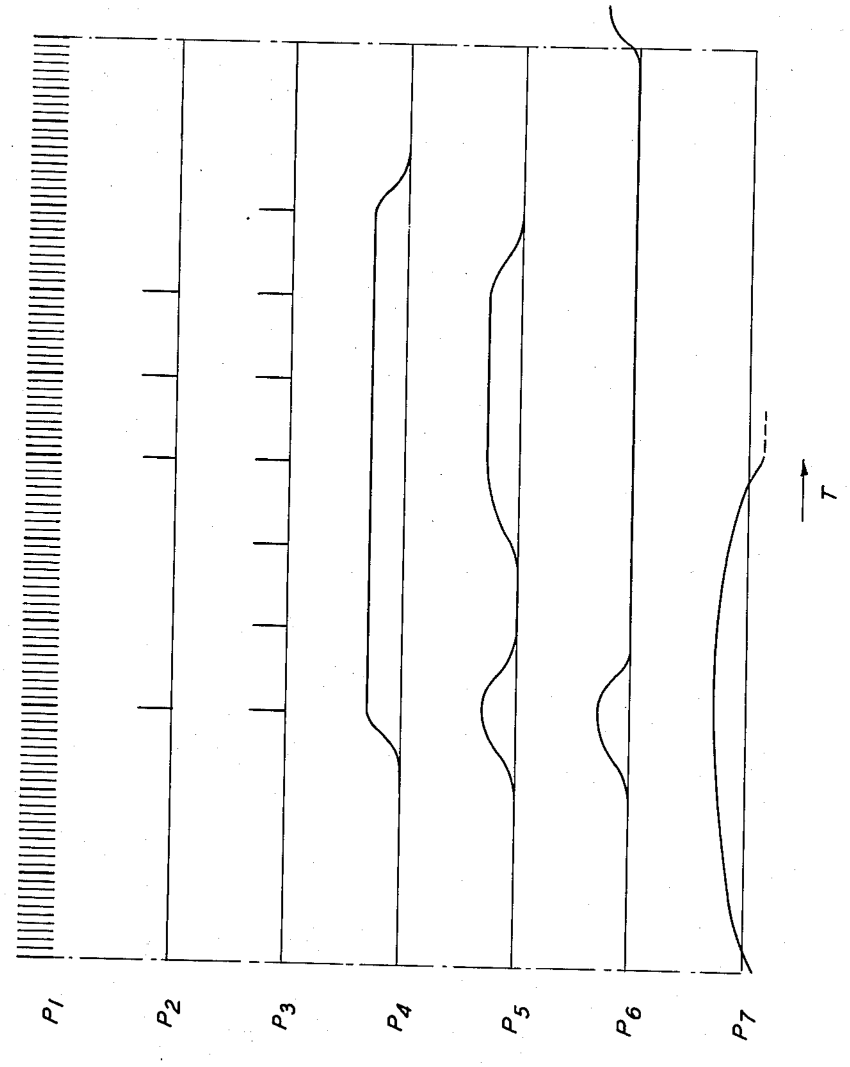
Fig. 10 shows wave forms illustrative of the repeater of Fig. 9.

Fig. 10 illustrates the various pulses which appear in the illustrative channel dropping repeater shown in Fig. 9. $P_1$ represents the time positions of the received pulses. Pulses may or may not be present at any one of these positions. These are the pulse positions in a 2000 channel seven digit pulse code modulation system with the pulses inserted as described in connection with Fig. 4. The center of the pulse positions are .009 microsecond apart and the pulses are .009 microsecond long. 14,000 of these pulses comprise a frame. The seven digit pulses of a given channel occur during a predetermined portion of each frame at a repetition rate of one-tenth the repetition rate of the pulse train $P_2$.

A channel pulse may be dropped and in its place another inserted every tenth pulse position. This makes one-tenth of the total or 200 channels available for dropping by dropping switches which operate at one-tenth the pulse rate (11.1 megacycles per second in the present illustration). This is made possible by the manner in which the pulses were inserted in the signal by the transmitting terminal (Fig. 4), the 200 channels made available at the repeater being all of the channels applied to any of the lines 1–10 in Fig. 4. The seven digit pulses from a pulse code modulation channel inserted by means of the dropping switch are shown in $P_2$. The pulses which operate the dropping switches are illustrated by $P_3$. These pulses are .0095 microsecond long—just slightly longer than the channel pulses.

Since the pulse code is a seven digit code, seven pulses must be dropped before a sample can be reconstructed. The line switches therefore operate at one-seventh the dropping switch rate (1.6 megacycles per second). The pulse $P_7$ in Fig. 10 represents operation of a specific line switch to accept a channel from that line. These may be generated from the shorter pulses $P_6$ of the same time position by the natural slowness of operation of the line switches.

The switching arrangement comprising switches $S_1$, $S_2$ and $S_3$ and hybrids 81 and 82 for dropping and adding channels in the illustrative repeater shown in Fig. 9 is as described in connection with Fig. 6A. Further the tube 83 which produces the dropping pulses i. e., the pulses which operate the dropping switches is as described in connection with Fig. 8.

The deflecting plates 65 of the tube 83 are driven by a sinusoidally varying wave of one-half the dropping pulse ($P_3$) frequency (5.55 megacycles per second) which is derived from the oscillator 84 by the transformer 79. The oscillator 84 is synchronized with the incoming pulse train by synchronizing pulses which are transmitted ten times each frame or every two hundredth pulse. This pulse may be given some distinguishing characteristic, e. g., amplitude, so that it may be readily separated from the incoming signal by the "sync separator" 85. The oscillator 84 is synchronized so that the electron beam of the pulse producing tube passes through the aperture in the masking electrode at the instant a channel pulse to be dropped appears in the *a* and *b* arms of the hybrid junction 81. (Compensations for inherent circuit delay may be made in any well known manner; delay elements, in general, have been omitted from the drawing to simplify the discussion where their only purpose would be to compensate for such delay.)

Whether or not a channel pulse will be dropped depends on the bias on the control grid 74 of the pulse producing tube 83. This grid is normally biased negative by the battery 76 to prevent the formation of a beam in the tube. Whether or not this bias will be overcome depends on the operation of any one of the line switches.

The line switches 80 for both the outgoing lines 86 and for the incoming lines 87 are controlled by the program generator 87. The program generator may comprise, for example, a delay line with a series of taps, or a ring counter of bistable devices. In any event a synchronizing pulse derived by the sync separator 88 triggers the device once each frame, causing it to produce a series of pulses ($P_6$) at the line switch operating rate, i. e., one every seventy pulse positions (1.6 megacycles per second). These pulses should have the length of the digit pulses produced by the coder and hence should be .09$\mu$ second long. The pulse which triggers the generator 87 once each frame is separated from the pulses occurring ten times per frame by the sync separator 88. Well-known television techniques, for example, may be employed to separate the two synchronizing pulse code groups. The pulses $P_6$ which operate the line switches appear sequentially at successive output terminals 1, 2, 3 . . . *m*-1 and *m*, commencing at terminal 1 and, if the switches 89 are closed, sequentially close the line switches of both incoming and outgoing lines. The switches 89 may for example, be locally operated, as by an operator, or may be electronically controlled from a remote terminal, as by a series of dialing pulses.

The pulses ($P_6$) which operate the line switches are also applied to the input of an "*m*-control threshold 1" device 91, where *m* is the number of lines available at the repeater. "*m*-control threshold 1" merely indicates that the device has *m* controls and that it will produce an output if any one control is energized (by a pulse $P_6$). The device may comprise for example a plurality of triodes with each of the *m* inputs being applied to a control grid and with the anodes all being tied together and connected to the output.

The device 91 therefore has an output which is substantially a replica of its input when any of the line switches 80 are operated. The output of this device drives the grid 74 of the pulse producing tube 83 positive causing dropping pulses to appear in the output of tube 83 as long as the grid remains positive. Since seven pulses are transmitted for each message sample, the pulse producing tube must produce seven dropping pulses for each operation of a line switch. It is therefore necessary to apply a pulse as shown by $P_4$ to the grid 74 for each pulse $P_6$. This pulse has a rise time corresponding to a .090$\mu$ second pulse. The pulse $P_4$ is obtained by connecting the output of the device 91 by means of the resistors 92 of fairly high value to seven taps on a delay line 93. In this manner a single input pulse $P_6$ to the device produces seven output pulses which can overlap, giving the required pulse $P_4$.

The pulses $P_4$ and $P_6$ need not be synchronized as accurately as the pulses $P_3$. In the present illustrative two thousand channel system with two hundred channels available at a dropping unit, the pulses $P_4$ and $P_6$ must be synchronized with the time accuracy corresponding to two hundred channels. For this reason the code group which synchronizes the generation of the pulses $P_4$ and $P_6$, i. e., the pulses which trigger the program generator 87, can be a relatively long group (one per frame in the present illustration) compared to the group which synchronizes the generation of the pulses which operate the dropping switches (ten per frame in the illustration).

The line switches 80 are generally of the type disclosed in W. D. Lewis Patent 2,535,303 dated December 26, 1950. Each switch comprises a T-network of asymmetrically conducting devices for example, germanium crystal diodes having like electrodes connected to a junction point. Referring specifically to the switch associated with the incoming line No. 1, the three diodes 94, 95 and 96 have their "anodes" connected together. Potentials applied to the shunt device 96 from the program generator 87 over lead 97 control the attenuation provided by the switch between the source of incoming signals (not shown) and the coder 101. When a negative control voltage is applied to the shunt device 96 which will be referred to as the control diode, making its cathode more negative than the junction point *p*, the control device 96 will be in its low resistance condition. In this condition current from the battery 98 will flow primarily through the control device in its forward direction. A small portion of the current, however, will flow through the series diodes 94 and 95 in their backward direction, biasing these devices in their high resistance condition so that the switch will have a low shunt and a high series resistance. A negative control voltage, therefore, in effect "opens" the line switch by introducing a high attenuation between the line input and the coder. A positive control voltage which biases the control diode 96 in the reverse or high resistance condition will cause the current from the battery 98 to divide between the series diodes 94 and 95 biasing these diodes in their low resistance condition. In this condition, the T-network is a low attenuation pad and input signals will appear as voltage drops across the common output resistor. Differences on the order of 110 decibels have been measured with such switches between the high and low attenuation conditions.

If desired, the battery 98 and resistors 99 may be omitted in which case the diodes are biased entirely by the gating signal from the program generator 87, and in which case it is generally desirable to shunt the control diode 96 of each switch by a resistor to supplement the low backward current which would flow through the control diode when in its high resistance condition. The battery 98, however, permits the switching of greater peak-to-peak voltage signals with the same amplitude gating or control signal without clipping or limiting. In fact, by applying a constant bias to the junction point *p*, it is only necessary that the control voltage swing through a range just slightly greater than the maximum expected signal voltage range to avoid clipping. Without the bias, it will be necessary in some instances that the gating voltage have an amplitude as much as five times that of the signal amplitude to avoid clipping.

The line switches 80 may be controlled by voltages of the opposite polarity to those described above by reversing the poling of the battery 98 and of the three diodes in each switch. With the diodes and biasing battery poled as shown, the pulses $P_7$ which operate the line switches rise from a negative base to a positive peak.

Instead of applying the control pulses sequentially to the control diodes of each line switch, the arrangements shown in Fig. 3A of the aforementioned Lewis patent may also be employed.

The coder 101 is of the "flash" type in contradistinction to coders of the sequential type. Flash coders are described in a copending application of W. M. Goodall Serial No. 67,211 filed December 24, 1949. Whereas in a sequential coder (for example the type described in an article by R. W. Sears which appears in the Bell System Technical Journal for January 1948 at pages 44 through 57) a narrow beam is swept across the apertured coder plate in a horizontal direction after being deflected in the vertical direction by an amount dependent on the applied signal, in a flash coder, a ribbon beam whose width is substantially equal to the width of the coder plate is turned on after being deflected vertically so that the seven digit pulses appear simultaneously at seven output terminals. These simultaneous pulses are translated into a sequence of pulses, $P_5$ in Fig. 10 by the translator 102.

The pulse $P_7$ which represents the operation of a line switch is made sufficiently long to permit the signals to build up at the coder input. To this end, either the natural slowness of response of the line switches may be relied on, or pulse-broadening networks may be inserted between the generator 87 which produces pulses $P_6$ and the line switches. Delay elements 103 are inserted in the control leads of the device 91 to compensate for the time of build-up. The output of the device 91 is also applied to the coder 101 to turn on the beam which causes the digit pulse to appear at its seven output terminals.

The switch 104 may be of the same type as the dropping switches previously described and is normally open. Digit pulses from the translator 102 close the switch 104 to permit a pulse of microwave frequency from the source 105 to be applied to the switch $S_3$. The switch $S_3$ will be closed at the proper instant as previously explained to permit the added pulses to assume the time position left vacant by the dropped pulses. It should be noted that the pulses $P_5$ produced by the translator can be fairly long and need be timed so that their centers occur every tenth pulse position. Accurate timing is resolved by the switch $S_3$.

Dropped channel pulses are rectified by the rectifier 106 and passed through the amplifier 107 to the input of a decoder 108. The decoded samples are then applied to the proper one of the *m* line 86, by the program generator 87 which closes the proper line switch. The delay elements 109 cause the appropriate line switch to close at the end of a code group rather than at the beginning of a group as with the switches 80 associated with the incoming line 87. These delay elements can also serve to broaden pulses of length .090μ second to .63μ second.

More complicated switching arrangements could of course be employed to operate the line switches other than sequentially. The arrangement shown is merely illustrative.

A feature of the channel dropping arrangement just described is that the very short pulses of the received signal are relayed and dropped under control of relatively long pulses. Only the output pulses of the tube 83 need be very short and accurately timed. This simplifies greatly the circuitry required to make up the repeater by making possible the use of principally low frequency narrow-band circuit components. This feature is also true of the transmitting and receiving terminals. The broad-band pulses appear only at the outputs of the gating amplifiers 32 in Fig. 4 and up to the outputs of the amplifiers 42 in Fig. 5.

The method of inserting digit pulses into the resultant signal every tenth position rather than into successive positions permits the use of reasonably long pulses $P_5$ from the coder 101. Pulses twice as long could be used by inserting successive digit pulses twenty pulse positions apart. This would require twenty gating amplifiers at each of the terminals unless the incoming pulse code modulating channels at the transmitter (Fig. 4) were interleaved. This would also reduce the number of channels available at a channel dropping repeater by one-half unless more intricate channel dropping equipment were employed.

By inserting pulses every tenth position a given coder and the lines which can be connected to it have access to a chosen tenth of the total number of channels. To increase the access the coder 101 must work faster, or, alternately operative coders may be employed; if the access is reduced, the coder may work more slowly. Several coders and decoders for each dropped switch may also be desirable to reduce cross-talk, if such is present.

Although the invention has been described as relating to specific embodiments employing specific frequencies, pulse durations etc., the invention should not be deemed limited to the disclosed embodiments since numerous other embodiments and modifications will readily occur to one skilled in the art without departing from the spirit or the scope of the invention.

What is claimed is:

1. A communication system employing pulse code modulation wherein instantaneous samples of signal waves are represented by groups of pulses in accordance with a binary code, a first terminal, a second terminal, a transmission medium interconnecting said terminals, means for multiplexing by code groups in time division a plurality of pulse code modulation signals into a first plurality of pulse trains, means at said first terminal for combining said first plurality of pulse trains into a single pulse train having a pulse repetition rate which is high relative to the pulse repetition rate of said plurality of signals, said last-named means comprising means to sequentially and recurrently inject the representation of a pulse from each of said first plurality of pulse trains into said transmission medium, the said representations each comprising a pulse whose duration is short relative to the duration of the pulses in the said first plurality of pulse trains and whose character depends on the binary character of the pulse which it represents, an intermediate terminal coupled to said medium and having a main transmission path through which the said single pulse train is propagated, a first switch normally closed, connected in said main path, a first branch transmission path branching from said main transmission path at a point ahead of said first switch, a second branch transmission path branching from said main transmission path at a point following said first switch, a second and third switch normally open, connected, respectively, in said first and second branch paths, a plurality of transmission means, switching means to controllably connect said first branch path to one of said plurality of transmission means, means for producing a pulse train comprising a plurality of pulse code modulation signals multiplexed by code groups in time division and having a pulse repetition rate equal to the repetition rate of the pulses in the said first plurality of pulse trains, means to apply said last-named pulse train to said second branch path, means to generate a pulse train having a repetition rate equal to the rate at which the said representations of the pulses of one of said plurality of pulse trains are injected into said medium, means to apply said generated pulses to said first, second, and third switches to open said first switch and close said second and third switches, means to synchronize the said generated pulse train and the said last-named pulse train with the occurrence at said repeater of the representations of a selected one of said plurality of pulse trains, and means at said second terminal to receive the said single pulse train as modified by said repeater.

2. In a time division multiplex system for the transmission of a plurality of pulse trains in a resultant time division signal, each of said pulse trains representing a communication channel, a first station having a plurality of amplifiers equal in number to the said plurality of pulse trains, said amplifiers each comprising a traveling-wave amplifier having electron beam forming means, means for turning said beam on and off, a wave transmission path, means for directing said beam along said path, input and output means coupled to said wave transmission path, and means for deflecting said beam in a transverse manner, a transmitting medium between said first and second stations, means for inserting a pulse from each of said pulse trains into said medium comprising means for applying each of said pulse trains to the said means which turn said beam on and off of one of said amplifiers, means for generating a sinusoidally varying wave, means for applying said sinusoidal wave to the said beam deflection means of each of said traveling-wave amplifiers with a different phase for each amplifier, a source of high frequency energy, and means for applying said high frequency energy to the said input of each of said amplifiers.

3. Time division multiplex apparatus in a system for transmitting recurrent frames of pulses comprising a plurality of traveling-wave amplifiers each having electron beam forming means, means to turn the said electron beam on and off, a helical transmission path along which the said beam is directed, input and output means each coupled to said helical path, and deflection means to laterally deflect the said beam, means to apply a plurality of signals to be combined in time division to the said means in each of said traveling-wave amplifiers which turn the said beam on and off, a source of radio frequency energy, means to apply the said energy to the said inputs of each of said amplifiers, means for generating a sinusoidally varying wave having a frequency equal to one-half the frame frequency, means to apply the said sinusoidal signal to the said beam deflection means in each of said amplifiers with a different phase at each of said amplifiers, and means to combine the outputs of the said amplifiers in a common output.

4. A combination in accordance with claim 3 wherein said last-named means comprises a plurality of wave-guide hybrid junctions.

5. In a $d$ digit pulse code modulation communication system, a first terminal comprising means for multiplexing in time division recurrent frames of pulses representing $n$ communication channels, said multiplexing means comprising means for interlacing code groups of $d$ pulses each into said recurrent frames from said $n$ channels, and means for inserting synchronizing pulses into each of said frames, the pulses in each code group occurring in said frames at a rate $(r/n)f$, where $f$ is the repetition rate of the pulses in said frames, and $r$ is an integer smaller than $n$, a channel dropping station for dropping up to $r$ channels comprising a main transmission path, means for applying said recurrent frames of pulses to said transmission path, a first branch path branching from said main path, first switching means in said main path and second switching means in said branch path, pulse generator means for producing $d$ pulses at a rate $(r/n)f$ in response to a single input pulse, means timed by said synchronizing pulse for producing a series of $r$ evenly spaced pulses per frame, selectively operated means for applying pulses from said series of pulses to said pulse generator means as input pulses, and means for applying the pulse produced by said pulse generator means to said first and second switching means for operating the same.

6. In a pulse code communication system carrying signals from $n$ channels by $n$ interleaved code groups of $d$ pulses each per frame, a first station including means for transmitting synchronizing pulses in one of said channels, and means for interleaving pulses from each code group in a time division signal at a repetition rate $(r/n)f$, where $f$ is the pulse repetition rate of said time division signal and $r$ is an integer smaller than $n$, a second station including means for selecting any of $r$ channels from said time division signal comprising a main transmission path having a first path branching therefrom, means for applying said time division signal to said main path, switching means connected in said branch path and in said main path to normally permit transmission in said main path and to normally block transmission in said branch path, pulse generator means for producing pulses at a repetition rate of $(r/n)f$, means for biasing said generator normally off, means timed by said synchronizing pulses for producing $r$ evenly spaced pulses per frame, means for selecting from said $r$ pulses per frame those pulses which corresponds with channels desired to be dropped, means responsive to said selected pulses for turning said generator means on, and means for applying the output of said pulse generator means to said switching means to operate the same.

7. A broad-band microwave switching arrangement comprising a main transmission path, a first microwave switch having an input and an output connected in said main path, a first branch path branching from said main path at a point ahead of said first microwave switch, a second branch path branching from said main path at a point following said first microwave switch, a second and a third microwave switch each having an input and an output connected respectively in said first and second branch paths, each of said microwave switches comprising a wave-guide hybrid junction having two pairs of conjugately related arms, the arms of one of said pairs comprising respectively the said input and output of said switch and means comprising a pair of non-linear impedance elements to terminate each of the arms of the other of said pairs.

8. The combination according to claim 7 wherein one of the arms of the said other pair is a quarter of a wavelength longer at the center frequency of said pulses than the other arm of the said other pair.

9. The combination in accordance with claim 7 and means to apply biasing voltages to the said non-linear impedance elements.

10. The combination in accordance with claim 7 wherein the non-linear impedance elements in the said first microwave switch normally terminates the said arms in which connected in an impedance substantially different from the characteristic impedance of said arms and wherein the said non-linear impedance elements in the said second and third microwave switches normally terminate the said arm in which connected in substantially their characteristic impedances.

11. The combination in accordance with claim 6 wherein said pulse generator means comprises a space discharge device having electron beam forming means, an anode, a plate containing an aperture intermediate said anode and said beam forming means, and means for laterally deflecting said beam at a frequency of one-half $(r/n)f$.

12. The combination in accordance with claim 6 and a second path branching from said main path including third switching means for normally blocking transmission in said second branch path and means for applying to said second branch path pulses to be inserted in the time positions left vacant by the pulses dropped through said first branch path.

13. The combination in accordance with claim 12 and decoding means connected to said first branch path, a first plurality of transmission lines, controllable distributor means for applying the output of said decoding means to said transmission lines, and said means for applying pulses to said second branch path comprising a second plurality of transmission lines, a pulse coder, controllable multiplexing means for connecting said second plurality of transmission lines to the input of said coder and means for applying the output of said coder to said second branch path, and means for applying said selected pulses to said distributor means and to said multiplexing means for controlling the same.

References Cited in the file of this patent

UNITED STATES PATENTS

| | | |
|---|---|---|
| 2,429,613 | Deloraine | Oct. 28, 1947 |
| 2,509,218 | Deloraine | May 30, 1950 |
| 2,520,534 | Edson | Aug. 29, 1950 |
| 2,547,001 | Grieg | Apr. 3, 1951 |
| 2,563,807 | Alfven | Aug. 14, 1951 |
| 2,587,734 | Kalfaian | Mar. 4, 1952 |
| 2,593,113 | Cutler | Apr. 15, 1952 |
| 2,603,714 | Meacham | July 15, 1952 |
| 2,627,574 | Feldman | Feb. 3, 1953 |